United States Patent [19]
Ono et al.

[11] Patent Number: 5,588,097
[45] Date of Patent: Dec. 24, 1996

[54] GRAPHIC DISPLAY METHOD AND APPARATUS FOR ROTATING AN OBJECT IN THREE-DIMENSIONAL SPACE

[75] Inventors: Makoto Ono, Yokohama; Hiroshi Minakata, Tokyo, both of Japan

[73] Assignee: International Business Machines Corporation, Armonk, N.Y.

[21] Appl. No.: 22,252

[22] Filed: Feb. 24, 1993

[30] Foreign Application Priority Data

Mar. 4, 1992 [JP] Japan .................................. 4-047303

[51] Int. Cl.$^6$ .............................................. G06T 17/40
[52] U.S. Cl. .............................................. 395/137
[58] Field of Search .................................. 395/127, 137, 395/161; 345/126, 157

[56] References Cited

U.S. PATENT DOCUMENTS

| | | | |
|---|---|---|---|
| 4,734,690 | 3/1988 | Waller ...................................... | 395/127 |
| 5,019,809 | 5/1991 | Chen ........................................ | 345/157 |
| 5,386,507 | 1/1995 | Teig et al. .............................. | 395/161 |
| 5,422,987 | 6/1995 | Yamada .................................. | 395/137 X |

OTHER PUBLICATIONS

"The Showplace Compannion", Pixar, 1990, pp. 101–106.
Chen et al., "A Study in Interactive 3–D Rotation Using 2–D Control Devices", Computer Graphics, vol. 22, No. 4, Aug. 1988, pp. 121–129.

*Primary Examiner*—Mark K. Zimmerman
*Attorney, Agent, or Firm*—Ronald L. Drumheller

[57] ABSTRACT

A semitransparent spherical surface having as its center O, a fixed point in an object being displayed on a screen of a tablet, is generated so as to enclose the object. Then, three degrees of freedom for orientation are determined by pen-manipulation on the spherical surface. That is, a plurality of points (P0–P3) on the spherical surface are specified in a predetermined order. Points P0 and P1 specify two polar surface coordinate positions on the spherical surface for rotation of the object in a polar coordinate system and simultaneously specify a rotation axis OP1 connecting the center O to point P1. Then a rotation angle α about this axis OP1 is specified by the specification of points P2 and P3. Then, calculations for rotating the object to the specified orientation are performed, and the rotated object is displayed. According to this method, the object in three-dimensional space can be rotated to an arbitrary orientation in a desired manner.

5 Claims, 10 Drawing Sheets

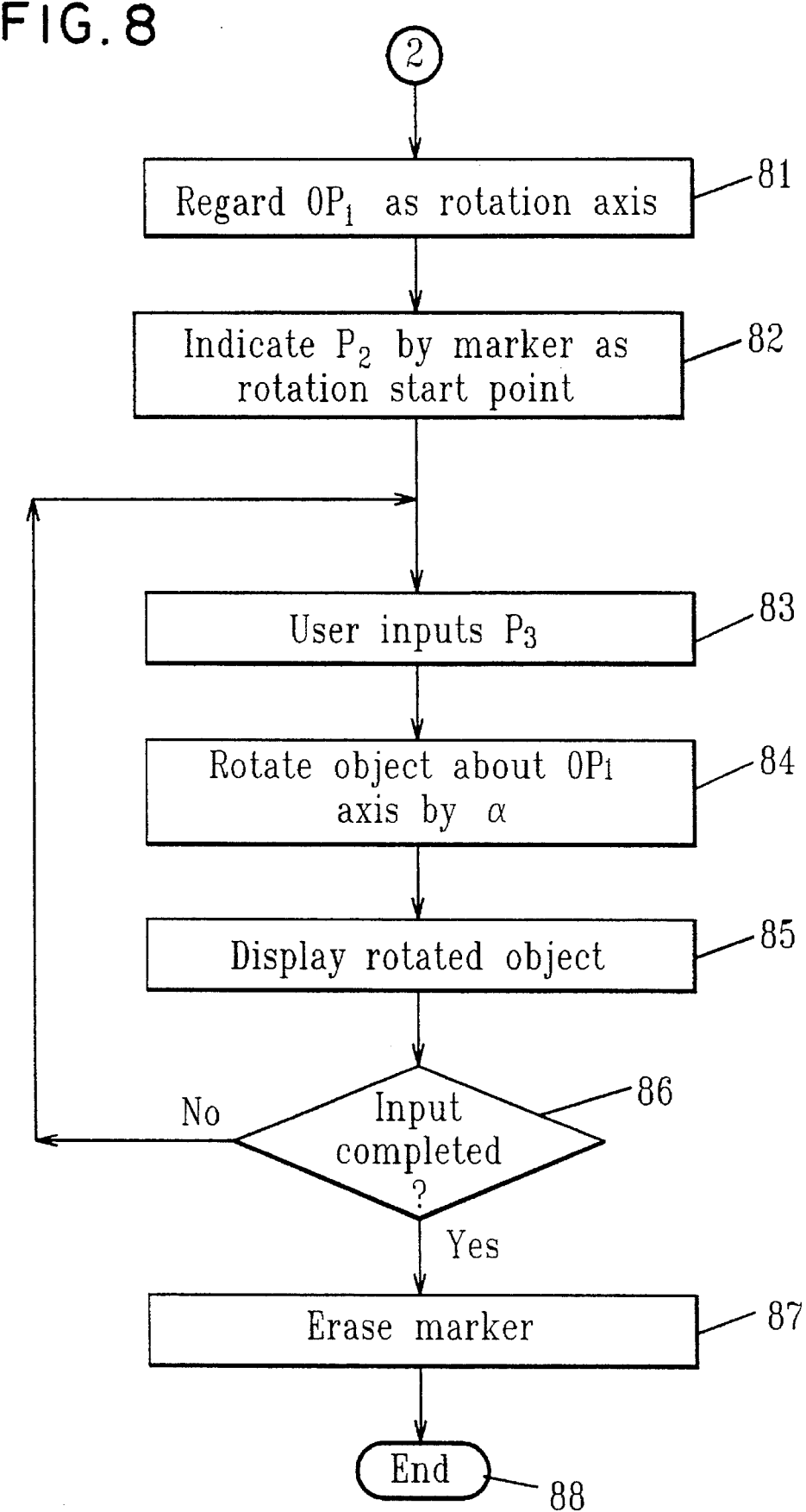

5,588,097

GRAPHIC DISPLAY METHOD AND APPARATUS FOR ROTATING AN OBJECT IN THREE-DIMENSIONAL SPACE

BACKGROUND OF THE INVENTION

The present invention relates to a method of rotating, in a graphic input apparatus, a displayed object in three-dimensional space to an arbitrary orientation using a two-dimensional input device such as a tablet.

An object in three-dimensional space has a total of six degrees of freedom; three degrees of freedom for position and three degrees of freedom for orientation. When a fixed point is set in an object to be processed and, therefore, the three degrees of freedom for position are determined, only the remaining three degrees of freedom for orientation are required to be specified. These are defined as the rotation of the object. The three degrees of freedom for orientation can be specified by inputting three parameters in a certain manner in a graphic input apparatus. Conventionally, these parameters are inputted, for example, in the form of angles with respect to the X-, Y- and Z-planes or positions in the spherical surface coordinate system. The general technique is to use, as an input means, a device through which a continuous value can be input, such as a dial or a slider.

On the other hand, the data to be inputted together with the above parameters is usually based upon coordinates oil a graphic display, and in many cases the data are inputted through special devices such as a tablet or a mouse. Since, in this manner, a plurality of input devices are used to rotate at object in three-dimensional space, intricate operations are required and the use of such special devices tends to increase the cost.

Japanese Patent Application Unexamined Publication No. Sho. 61-36791 (U.S. Pat. No. 4,734,690) discloses a method in which, while the position of the object to be processed is fixed, the viewing point is changed by utilizing an imaginary spherical surface enclosing the object. However, in this method, since the posture of the object does not vary, the changing of the viewing point can provide only a limited range which is viewable.

SUMMARY OF THE INVENTION

A principal object of the present invention therefore is to solve the above problems, and, to perform the operation of rotating an object ill three-dimensional space more directly to improve the ease of operations, and to make it possible to change the posture of the object over a wide range.

In accordance with the teachings of the present invention, a fixed point in a displayed object is determined, and a semitransparent spherical surface is then provided which encloses the object and has the fixed point as its center. Then, on the spherical surface, a plurality of points for determining the three degrees of freedom for orientation are specified in a predetermined order. As a result of such specification of points, for example, a rotation axis and then a rotation angle about this axis are specified. Then, a calculation for rotating the object in the specified orientation is performed, and the rotated object is displayed. In this manner, an object in three-dimensional space can be rotated to an arbitrary orientation in a desired manner.

Further objects of the present invention will become more clearly apparent when the following description is read in conjunction with the accompanying drawings.

BRIEF DESCRIPTION OF THE DRAWINGS

FIG. 8 is a flowchart showing details of a process performed in association with input of an axial rotation angle of FIG. 5;

DETAILED DESCRIPTION

Figure 1A:
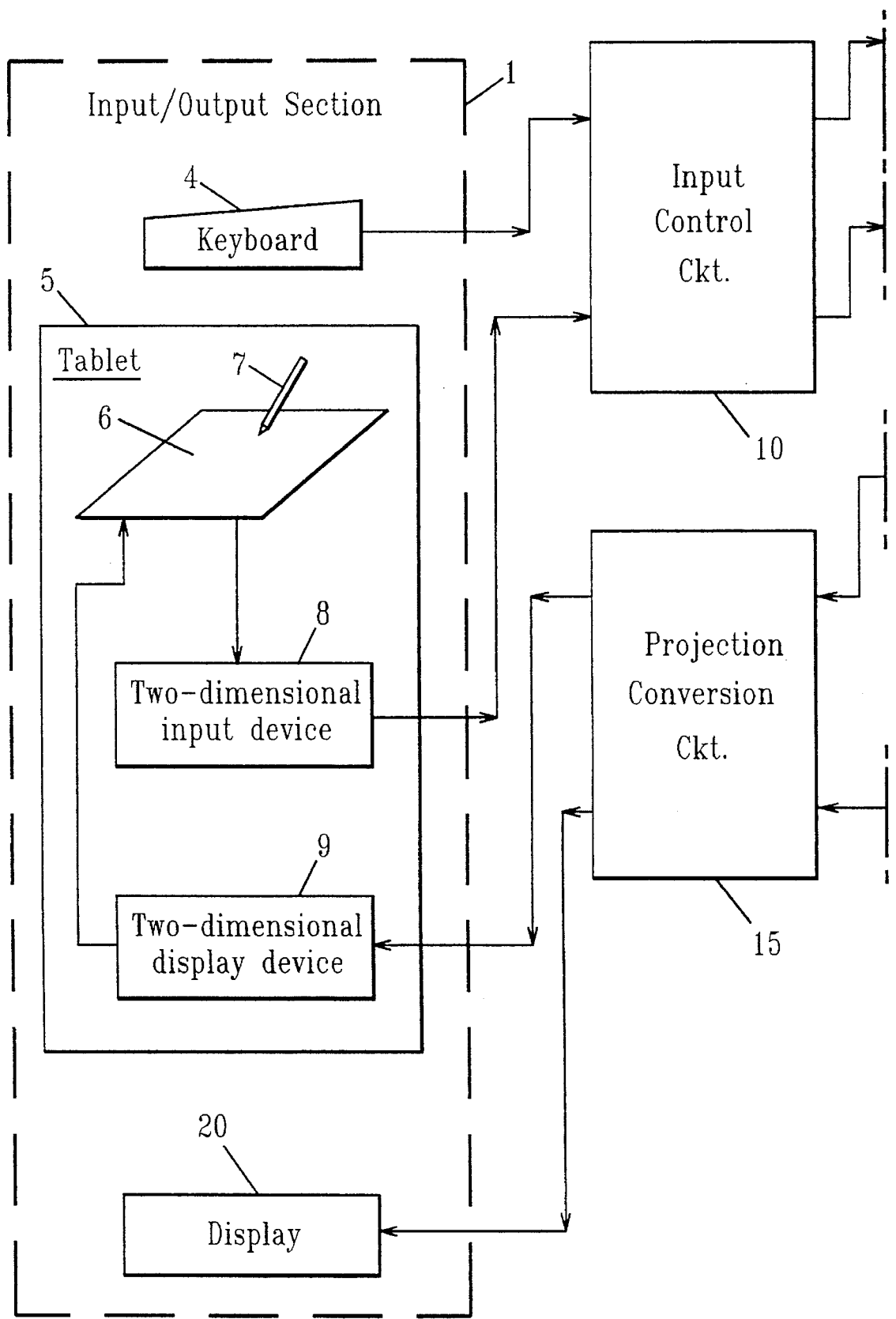
FIG. 1 is a block diagram showing a configuration of a graphic input apparatus according to a preferred embodiment of the present invention.
Figure 1B:
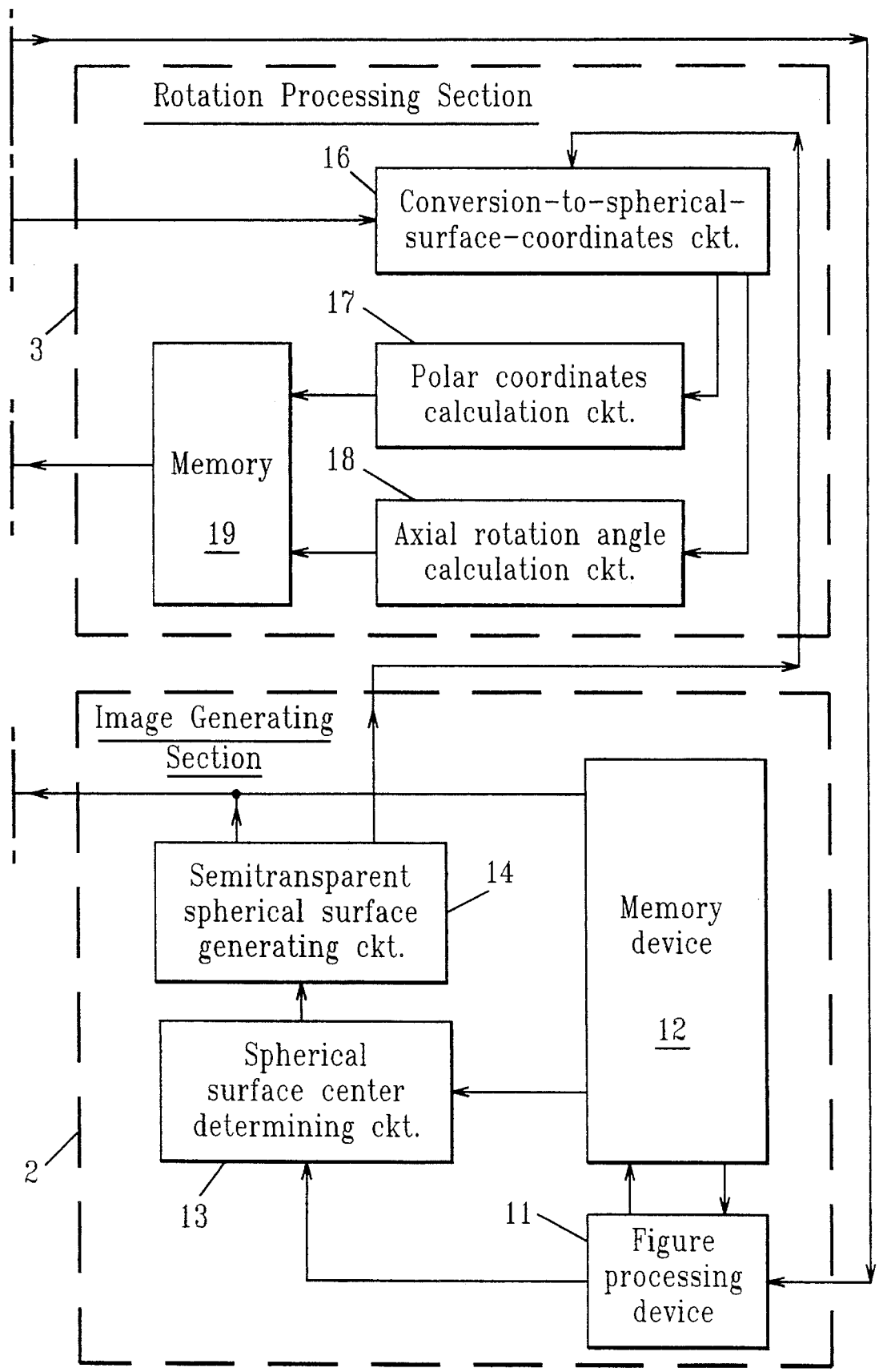

Referring now to the figures and to FIG. 1 in particular, there is shown a configuration of a graphic input apparatus according to a preferred embodiment of the present invention. In FIG. 1, reference numeral 1 represents an input/output section; reference numeral 2 represents an image generating section; and reference numeral 3 represents a figure rotation processing section. The input/output section 1 includes a keyboard 4 and a table 5 which are used for inputting character and numerical information, and its operation mode can be changed between an image generation mode and a figure rotation mode in receiving such information. Positional information (x, y) that has been indicated by the user, for example with a pen 7 on a display screen 6 of the tablet 5, is input to the image generating section 2 and to the rotation processing section 3 via a two-dimensional input device 8. Meanwhile, the processing results of the image generating section 2 and the rotation processing section 3 are provided to the display screen 6 via a two-dimensional display device 9. Reference numeral 10 denotes an input control circuit that provides the input information to the image generating section 2 or to the rotation processing section 3 in accordance with the input mode. The image generating section 2 includes a figure processing device 11 for generating, in the image generation mode, a three-dimensional figure based on the input information from the user, and a memory device 12 for storing the data (X, Y, Z) of this figure. The image generating section 2 further includes a circuit 13 for determining, in the figure rotation mode, the center of a semitransparent spherical surface and a circuit 14 for generating tile semitransparent spherical surface to be displayed on the display screen 6.

The figure rotation processing section 3 consists of the following components. A conversion-to-spherical-surface-coordinates circuit 16 which converts, during the figure rotation mode, the inputted two-dimensional coordinates (x, y) into, spherical surface coordinates (θ, Φ). A polar coordinates calculation circuit 17 and an axial rotation angle calculation circuit 18 perform calculations to determine the three degrees of freedom to be used for controlling the posture of the object in three-dimensional space. A memory 19 stores the results of the above calculations. More specifically, the polar coordinates calculation circuit 17 calculates the two rotation angle components of the polar coordinates, and the axial rotation angle calculation circuit 18 calculates the rotation angle about an axis defined by the center of the spherical surface and a specified point on the spherical surface.

A projection conversion circuit 15 calculates the posture of the object after it is subjected to the rotation based on the figure data (X, Y, Z) of the object sent from the memory device 12 and the three degrees of freedom for rotation that have been calculated by the rotation processing section 3, and converts the calculation results into two-dimensional coordinates. The results are displayed on the display screen 6 by the two-dimensional display device 9. If necessary, the results are also outputted to external output devices such as a display 20 or a printer.

Figure 2:
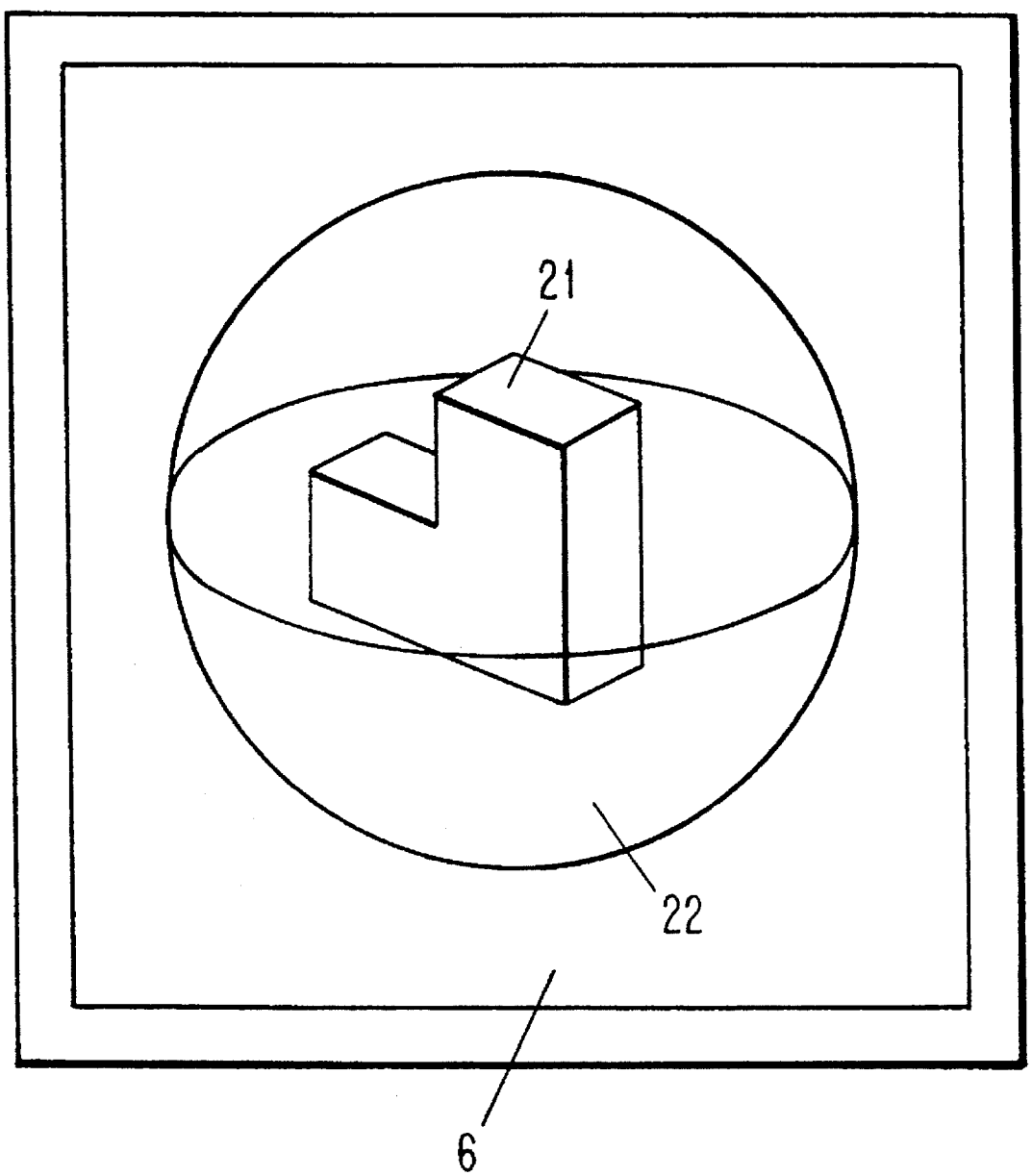
FIG. 2 is a drawing showing an example of a display picture in an input/output section of FIG. 1.

FIG. 2 shows an example of a display of the display screen 6 of tablet 5. Reference numeral 21 represents an object in three-dimensional space to be subjected to the rotation operation, and numeral 22 represents a semitransparent spherical surface that is displayed in the figure rotation mode so as to enclose the object 21.

Figure 3:
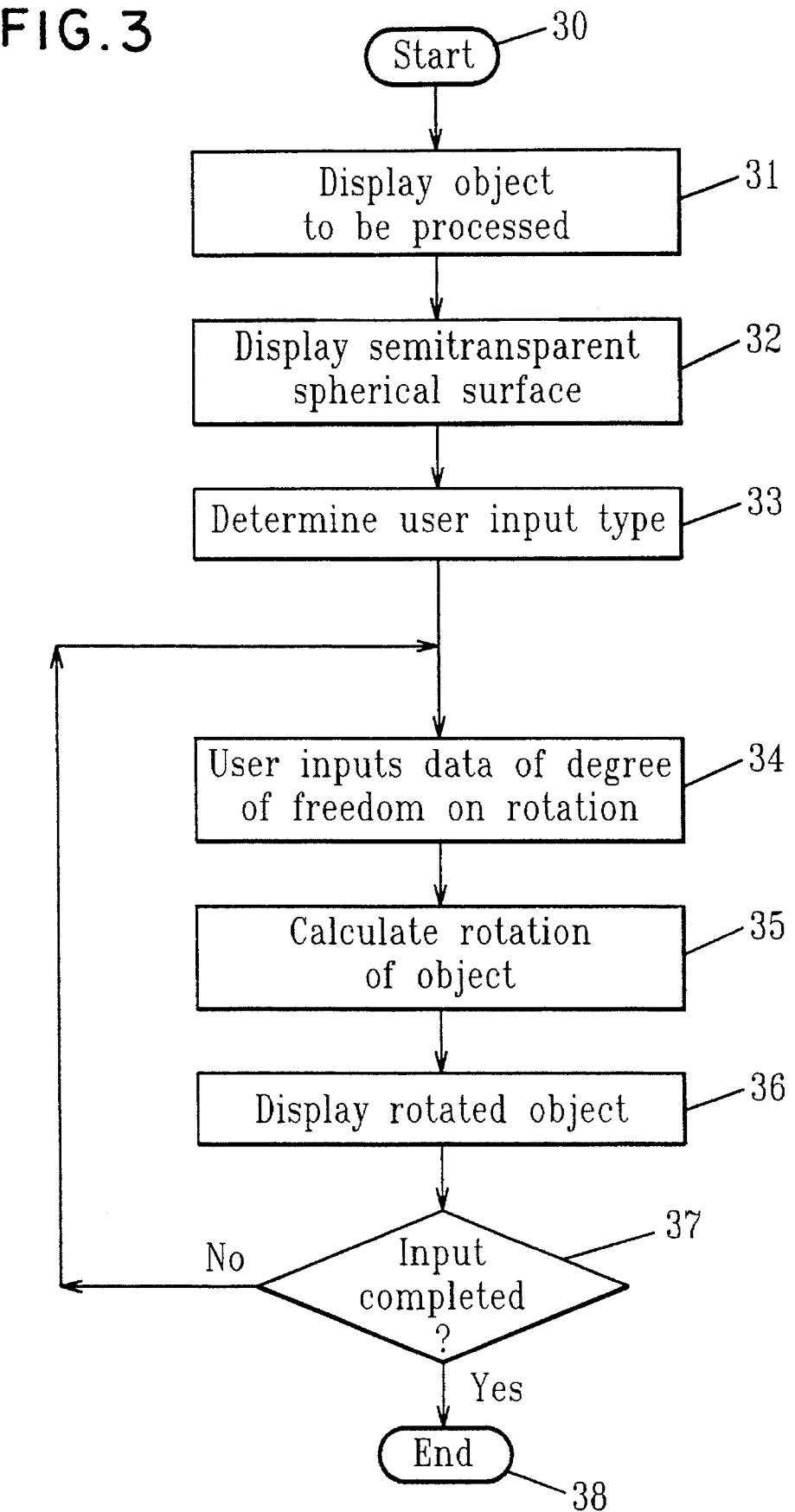
FIG. 3 is a flowchart outlining a procedure for rotating all object in the apparatus of FIG. 1.

FIG. 3 is a flowchart of a procedure for rotating an object in three-dimensional space in the figure rotation mode. First, the data of the three-dimensional figure of the object 21 to be processed which has been generated in the image generating section 2 in the image generation mode, is read out and displayed on the display screen 6 (step 31). Then, the semitransparent spherical surface 22 is superimposed on the figure of the object 21 (step 32). Then, the type of user input for the rotation operation is determined (step 33), which can, for example, be a method of automatically determining a specified component based on input using a pen 7 (automatic determination) or can be a method of explicit specification by the user. Automatic determination is preferable in order to improve the ease of operations. Then, the user inputs the data necessary for the rotation operation (step 34). Finally, the figure after it is subjected to the rotation is calculated (step 35) and displayed on the display screen 6 (step 36).

Figure 4A:
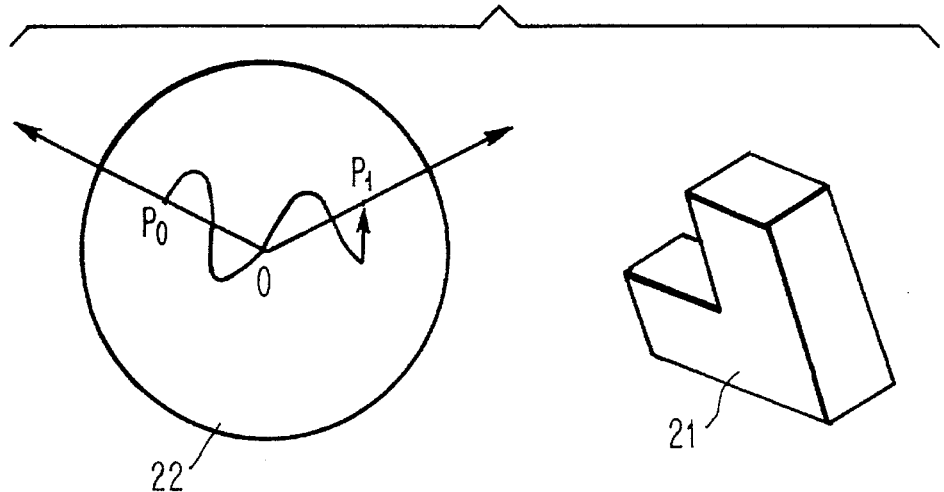
FIGS. 4(a), 4(b) and 4(c) are drawings showing how the rotation is specified according to the procedure of FIG. 3.
Figure 4B:
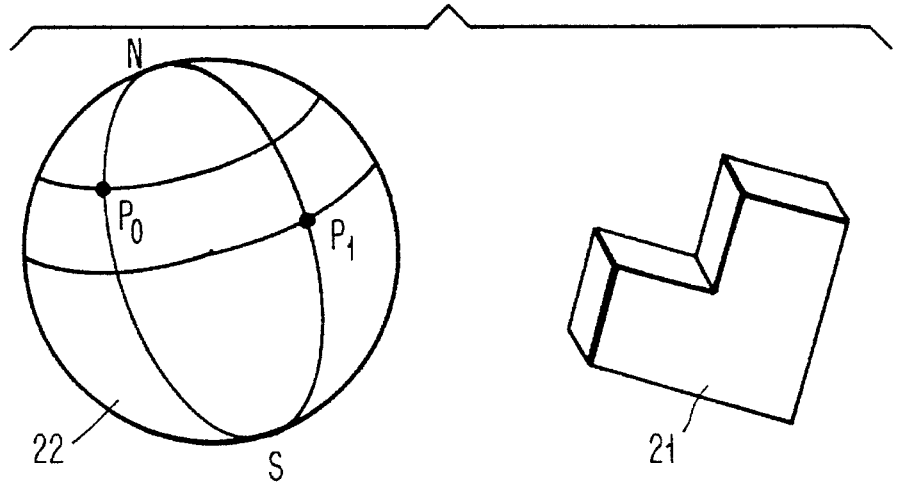
Figure 4C:
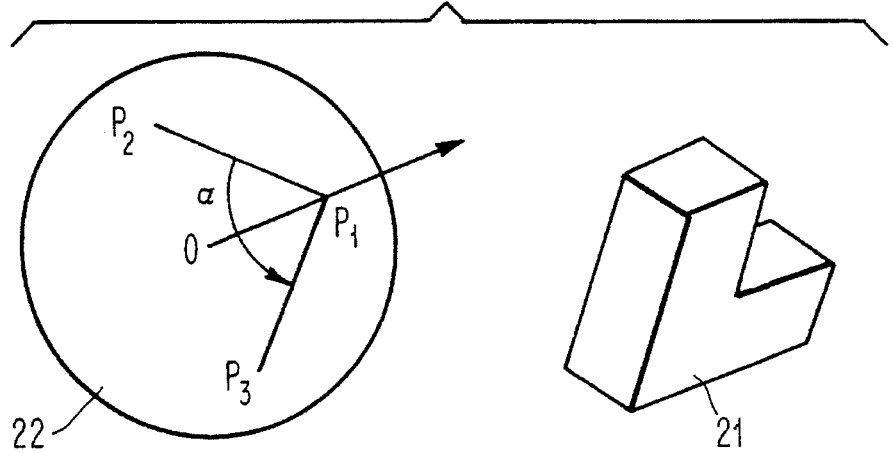

The data to be inputted by the user for the rotational operation includes components for the surface coordinates (i.e., polar coordinates) and a component for the rotation angle about an axis. As shown FIG. 4(a), the polar coordinates are specified by moving a point P on the spherical surface 22 from P0 to P1 to rotate the object 21 together with the spherical surface 22. In tills process, since one degree of freedom, that is the rotation about an axis defined by the center O of the sperical surface 22 and the point P0 or P1 on the spherical surface 22, still remains to be determined, the directions (N–S) of meridian lines before and after the movement are hypothetically made constant, i.e., their initial values are maintained, as shown in FIG. 4(b). Then, as shown in FIG. 4(c), a rotation angle α about the axis (O-P1) after the movement is specified by determining points P2 and P3. Interactive data input operations are repeated until the user's desired state is attained (step 37). When points P0 and P1 are the same point on the spherical surface 22, the object rotates about the axis (O-P0) by the rotation angle α by specifying point P0 and then determining points P2 and P3.

Figure 5:
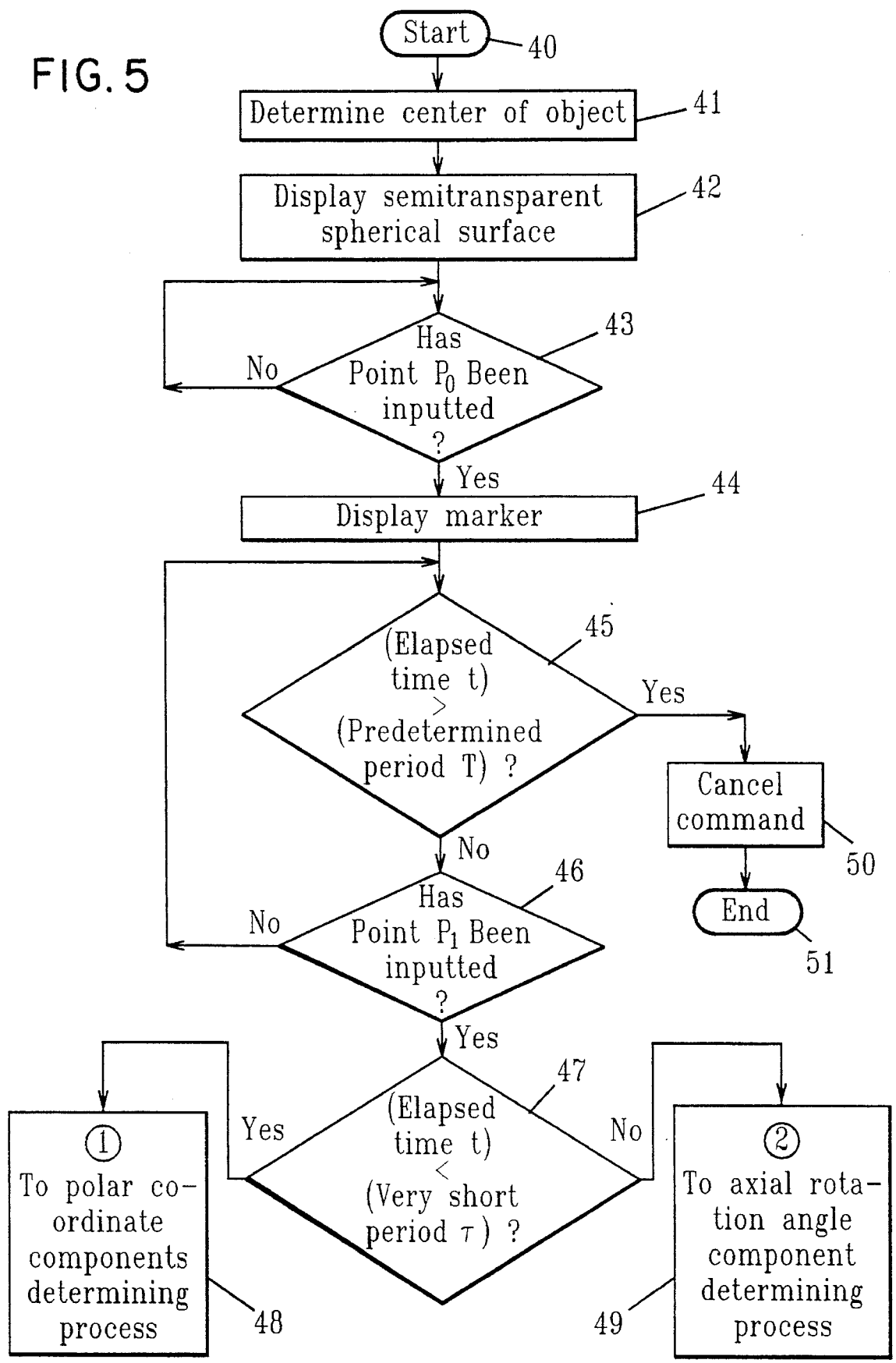
FIG. 5 is a flowchart showing a procedure for automatically judging the specified components of the degree of freedom for rotation.

Next, with reference to FIGS. 5 to 9, the procedures for specifying the respective three degrees of freedom for rotation are described below in detail. FIG. 5 shows the case of automatically determining the specified components of the degrees of freedom for rotation.

First, the center position of the object 21 being displayed on the screen 6 is automatically determined as a fixed point by the spherical surface center determining circuit 13 (step 41). If the user wants to select a point other than the object center as the fixed point, the user can specify such a point separately. After the determination of the fixed point of the object 21, the semitransparent spherical surface 22 having the fixed point as its center O is generated by the semitransparent spherical surface generating device 14, and is displayed on the display screen 6 in superposition on the object (step 42). The display of the semitransparent spherical surface is performed by modifying the display data for all the original pixels by a calculation using an alpha buffer in writing data of the respective pixels of the spherical surface 22 into a frame buffer. Alternatively, the display call be performed easily by a "pixel-thinning" method in which data of all the original pixels are rewritten every second pixel and the remaining pixel data not rewritten remain unchanged.

Then, the user specifies one point on the spherical surface 22 displayed on the display screen 6 by pen 7 (step 43). The two-dimensional coordinates (x, y) of this point are inputted to the conversion-to-spherical-surface-coordinates circuit 16 via the two-dimensional input device 8, where the two-dimensional coordinates are converted into the following three-dimensional coordinates of the point P0 on the imaginary spherical surface 22:

$$P_0 = (\cos \theta \cos \Phi, \sin \Phi, \sin \theta \cos \Phi).$$

Since the spherical surface 22 being displayed is not a figure defined by the user, but is a figure generated by the image generating section 2, the conversion-to-spherical-surface-coordinates circuit 16 can readily calculate the three-dimensional position of P0.

Then, a marker as a cue for future operations is displayed at the position of P0 which has been pen-inputted (step 44). Depending on an instruction from the user, an axis connecting the center O of the spherical surface 22 and the first-input point P0 is also displayed.

Next, it is automatically determined whether the user is going to input the polar coordinates or the axial rotation angle described above, and the determination is registered in the apparatus in advance. For example, such determination is automatically performed in the following manlier in accordance with the user's operation of moving the pen 7 on the spherical surface 22.

(A) If another point P1 is inputted immediately after the first point P0, more specifically, if another point P1 is inputted within a predetermined period T and further within a very short period τ from the input of the first point P0 (step 45–47), it is determined that the polar coordinates are going to be inputted (step 48).

(B) If another point P1 is inputted within a relatively short period from the input of the first point P0, more specifically, if another point P1 is inputted within the predetermined period T but after a lapse of the very short period τ it is determined that the axial rotation angle is going to be inputted (step 49).

(C) No input within the predetermined period T is regarded as a cancel operation. In this case, the first marker is deleted (step 50), and the process returns to the initial state.

Figure 6:
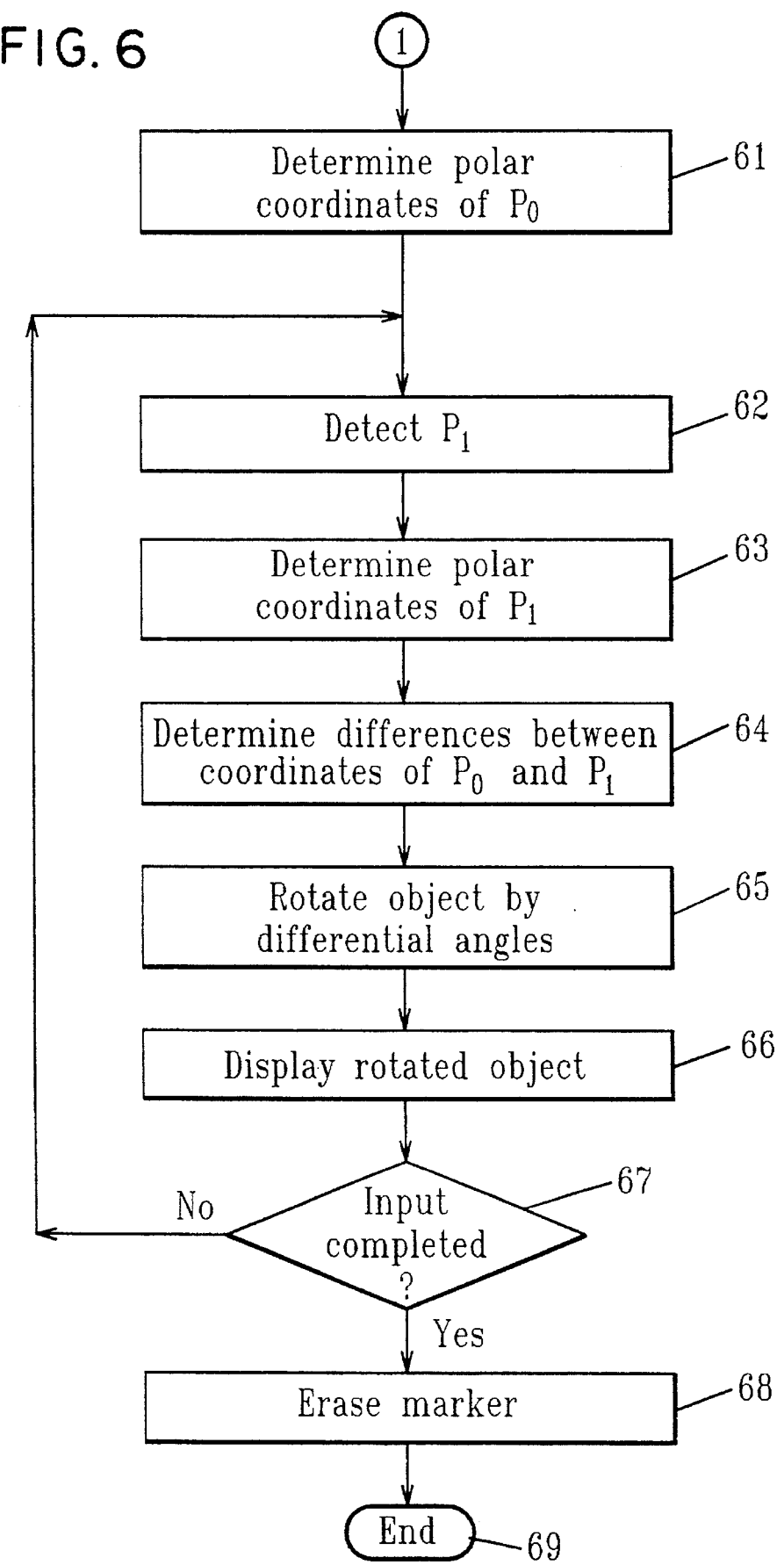
FIG. 6 is a flowchart showing details of a process performed in association with input of polar coordinates of FIG. 5.

FIG. 6 is a flowchart showing a procedure to be performed in response to input of the polar coordinates (step 48). This process is described below with reference to FIG. 7.

First, the polar coordinates ($\theta_o$, $\Phi_o$) of the point $P_o$ being displayed on the spherical surface 22 are determined from its three-dimensional coordinates (step 61). Next, the polar coordinates of the final input position P1 of a continuous trace having been made by the user on the spherical surface 22 using the pen 7 (step 63) are determined. Then, the differences between the coordinates of P0 and P1, i.e., ($\theta_1 - \theta_0$) and ($\Phi_1 - \Phi_0$), are determined (step 64). These differences correspond to the variation of the posture of the object 21 from its initial state. The posture of the object after it is subjected to rotation is obtained by adding this relative movement to its initial orientation. This calculation is performed by tire projection conversion circuit 15 in the manner as described below, and the calculation results are stored in a memory (not shown) and displayed on the display screen 6 (step 65 and 66). In this manner, the user can rotate the object 21 to a desired orientation. Since points P0 and P1 can be specified by the simple operation of freely moving the pen 7 on the spherical surface 22, the user can rotate the object 21 to an arbitrary orientation as desired. Upon completion of the input, the marker that was indicated at the first stage is erased, and the process returns to the initial state (step 67–69).

FIG. 8 is a flowchart showing a procedure for the operation of inputting the axial rotation angle, as mentioned in step 49 of FIG. 5, i.e., the operation of specifying a value for the remaining one degree of freedom in the form of axial rotation. This process is described below with reference to FIG. 9.

First, a line segment OP1 connecting the point P1 that has already been inputted and the center O of the imaginary spherical surface 22 is regarded as the rotation axis (step 81). Then, a point P2 on the spherical surface 22 that is inputted by the user is indicated by a marker as the rotation start point (step 82). The user moves the pen 7 from the start point P2 in the direction of the desired rotation and then specifies another point P3 on the spherical surface 22, so that the angle $P_2P_1P_3$ defines a rotation angle $\alpha$ about the axis OP1 (step 83–84). Next, the axial rotation angle $\alpha$ is calculated by the axial rotation angle calculation circuit 18. The posture of the object 21 after it is subjected to the rotation is calculated by the projection conversion circuit 15 and the calculation results are displayed on the display screen 6 (step 85). By repeating the above operations, the user can rotate the object 21 in the desired direction (step 86). Upon completion of the input, the marker that was indicated at the first stage is erased, and the process is finished (step 87 and 88).

The coordinate conversion calculations performed in the projection conversion circuit 15, the polar coordinates calculation circuit 17 and the axial rotation angle calculation circuit 18 are now described. Conversion between coordinates is performed using vectors and matrices. To simplify the discussion, a conversion matrix TA is described that is used in the axial rotation angle calculation circuit 18 to perform the rotation of the angle $\alpha$ about the axis OP1 starting from the point P2.

Figure 9:
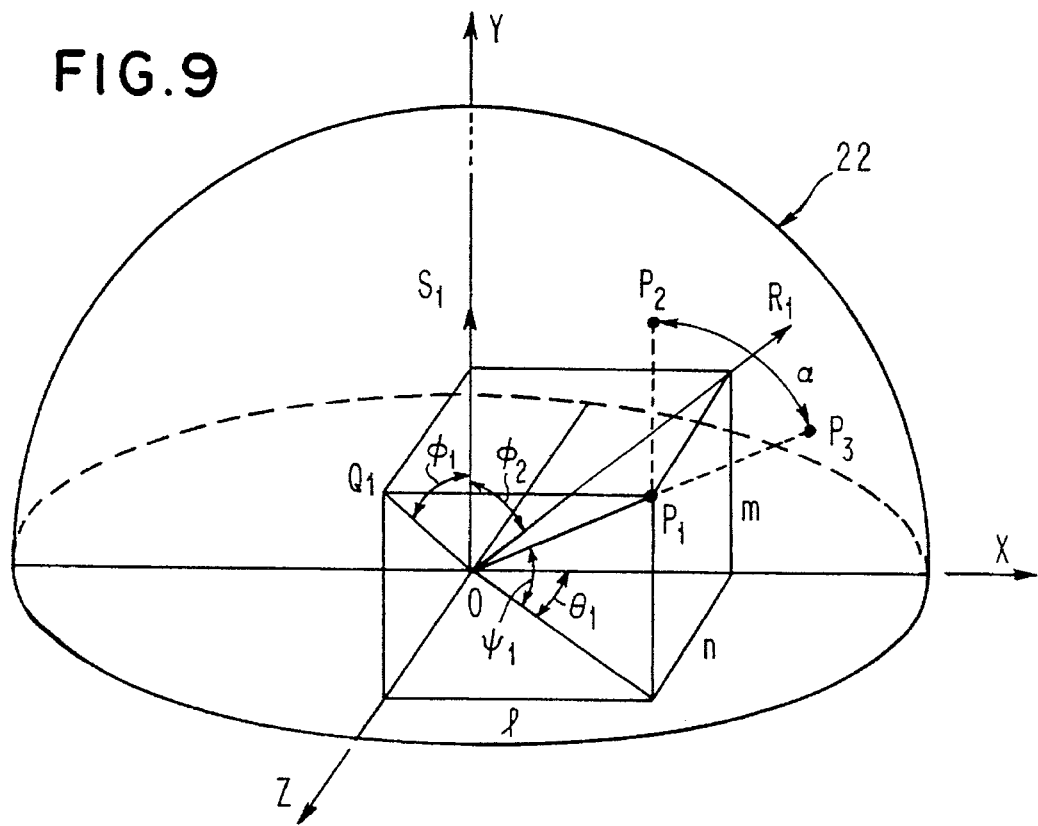
FIG. 9 is a drawing showing the axial rotation angle to be inputted in the process of FIG. 8.

In FIG. 9, letting l, m and n respectively represent the x, y and z components of a unit vector in the direction of the rotation axis O-P1, the following equations are obtained:

$$\tan \theta_1 = n/l \qquad (1)$$

$$\tan \Phi_1 = m/\sqrt{l^2 + n^2} \qquad (2)$$

$$l^2 + m^2 + n^2 = 1 \qquad (3)$$

Using equations (1) to (3), results in:

$$(l, m, n) = (\cos\theta_1 \cos\Phi_1, \sin\Phi_1, \sin\theta_1 \cos\Phi_1).$$

OQ1 is the vector obtained by projecting the vector OP1 onto the Y-Z plane, and $\Phi_1$, is the angle formed by the vector OQ1 and the Y-axis. Vectors OR1 and OS1 are obtained by rotating the respective vectors OP1 and OPQ1 about the X-axis by an angle of $-\Phi_1$. A conversion matrix T1 describing this relationship is:

$$T_1 = \begin{bmatrix} 1 & 0 & 0 & 0 \\ 0 & \cos\phi_1 & -\sin\phi_1 & 0 \\ 0 & \sin\phi_1 & \cos\phi_1 & 0 \\ 0 & 0 & 0 & 1 \end{bmatrix}$$

In this manner, tire vector OS1 along the Y-axis and the vector OR1 in the X-Y plane are obtained using the conversion matrix T1.

Next, $\Phi_2$ is the angle formed by the vector OR1 and the Y-axis. If the vector OR1 is rotated by $\Phi_2$ about the Z-axis, it becomes coincident with the Y-axis. This relationship is described by the following conversion matrix T2:

$$T_2 = \begin{bmatrix} \cos\phi_2 & \sin\phi_2 & 0 & 0 \\ -\sin\phi_2 & \cos\phi_2 & 0 & 0 \\ 0 & 0 & 1 & 0 \\ 0 & 0 & 0 & 1 \end{bmatrix}$$

A conversion matrix T3 for the rotation of the angle $\alpha$ (=P2P1P3) about the Y-axis is:

$$T_3 = \begin{bmatrix} \cos\alpha & 0 & -\sin\alpha & 0 \\ 0 & 1 & 0 & 0 \\ \sin\alpha & 0 & \cos\alpha & 0 \\ 0 & 0 & 0 & 1 \end{bmatrix}$$

Further, conversion matrices $T_{1'}$ and $T_{2'}$ are obtained by subjecting the respective conversion matrices $T_1$ and $T_2$ to inverse conversion.

Therefore, a conversion matrix TA for rotating a point P2 about an axis of OP1 by the angle $\alpha$ is:

$$TA = T_1 T_2 T_3 T_{2'} T_{1'}.$$

where $$\cos \Phi_1 = m/\sqrt{l^2 + n^2}, \sin \Phi_1 = n/\sqrt{l^2 + n^2}$$

$$\cos \Phi_2 = 1/\sqrt{l^2 + m_2}, \sin \Phi_2 = m/\sqrt{l^2 + m^1}$$

Since l, m and n are functions of $\theta_1$ and $\Phi_1$, the conversion matrix TA can be expressed as a function of $\theta_1$, $\Phi_1$ and the rotation angle $\alpha$ only. The con, version matrix TA to be used in tire axial rotation angle calculation circuit 18 is thus determined.

Figure 7:
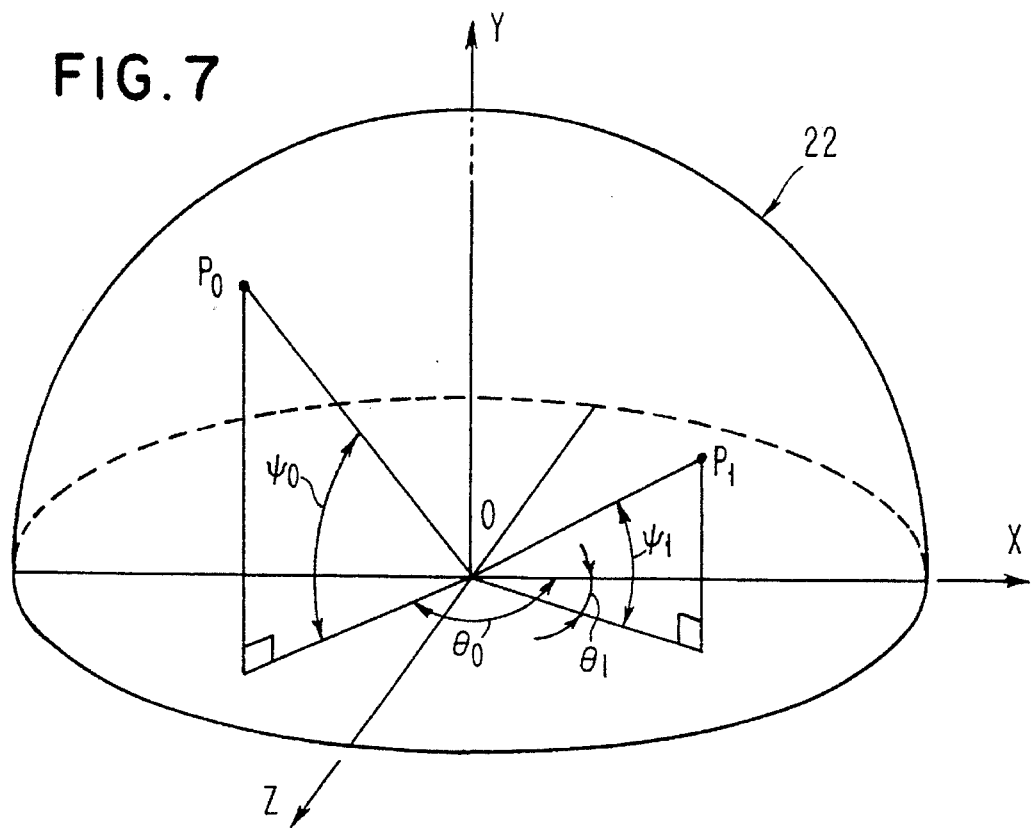
FIG. 7 is a drawing showing the polar coordinates to be inputted in the process of FIG. 6.

In a similar manner, the conversion matrix TB to be used in the polar coordinates calculation circuit 17 can be expressed as a function of $\theta_0$, $\Phi_0$, $\theta_1$ and $\Phi_1$ shown in FIG. 7.

If the projection conversion circuit 15 employs a perspective projection method, a conversion matrix TC, in circuit 15 is expressed as follows:

$$T_{C_1} = \begin{bmatrix} 1 & 0 & 0 & 0 \\ 0 & 1 & 0 & 0 \\ 0 & 0 & 0 & -1/R \\ 0 & 0 & 0 & 1 \end{bmatrix}$$

where the Z-axis is taken as the viewing axis and the point z=R is taken as the projection center. Furthermore, if a parallel projection method is employed, the conversion matrix $TC_2$ becomes:

$$T_{C2} = \begin{bmatrix} 1 & 0 & 0 & 0 \\ 0 & 1 & 0 & 0 \\ 0 & 0 & 0 & 0 \\ 0 & 0 & 0 & 1 \end{bmatrix}$$

Either $T_{c1}$ or $T_{c2}$ may be employed as the conversion matrix $T_c$.

Finally, a two-dimensional output P' (x, y) that is to be used when the two-dimensional display device 9 produces a picture on the display screen 6 is obtained by multiplying together the three-dimensional coordinates of each point P ($P_0$–$P_3$) on the imaginary spherical surface 22 and the conversion matrices of the projection conversion circuit 15, the polar coordinates calculation circuit 17 and the axial rotation angle calculation circuit 18.

$$P' = P T_A T_B T_c$$

Figure 10:
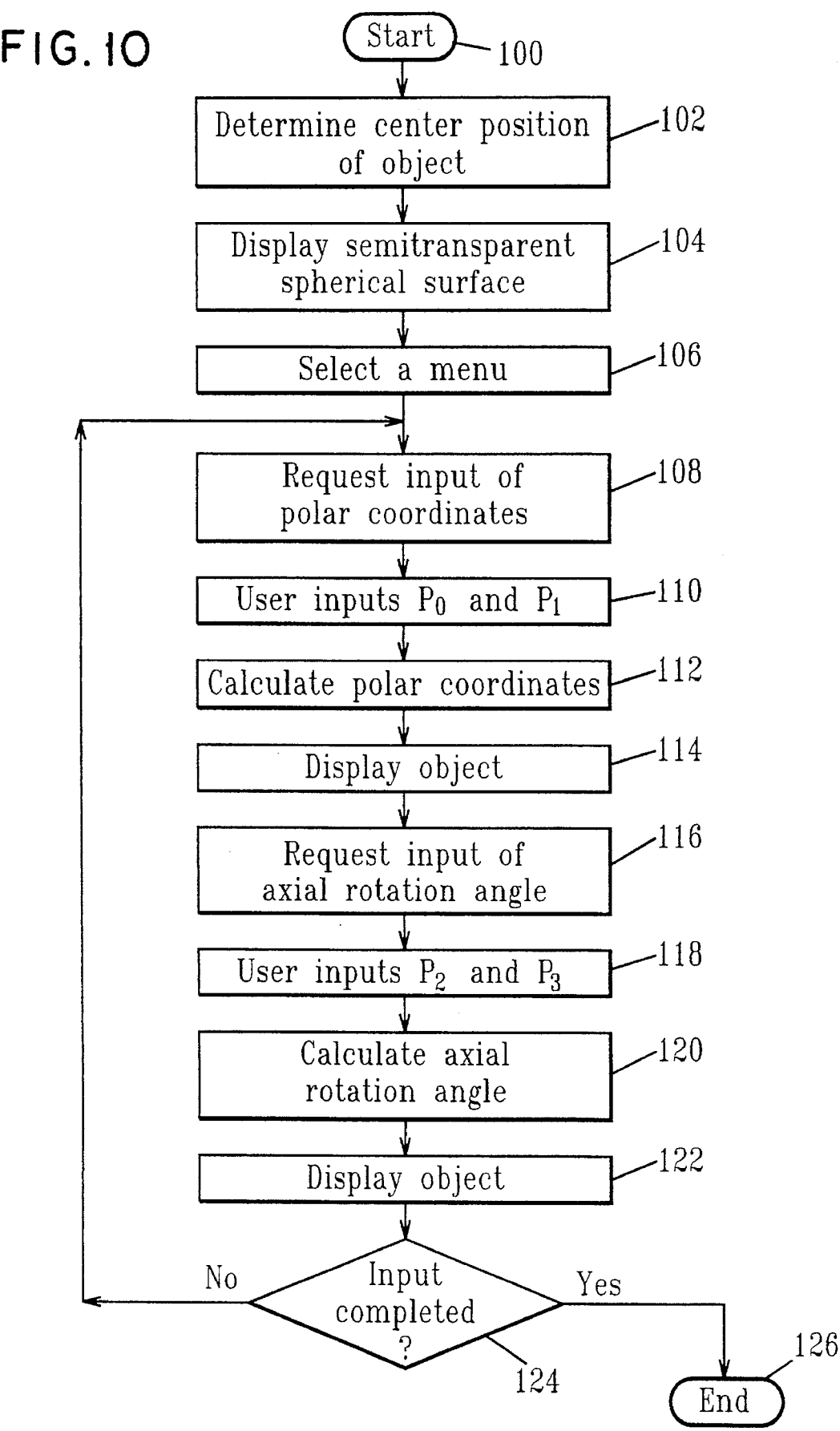
FIG. 10 is a flowchart showing a procedure for specifying the components of the degree of freedom for rotation through menu selection.

FIG. 10 is a flowchart showing another procedure for specifying the components of the degrees of freedom for rotation, i.e., a procedure in which the user explicitly inputs parameters through menu selection. In this embodiment, menu pictures for input are displayed on the display screen 6, and the user specifies the components of the degree of freedom for rotation in an interactive manner through menu selection. Inputting of the polar coordinates (step 108–110) and the axial rotation angle (step 116–118) can be performed by sequentially specifying respective points P(P0–P3) on the imaginary spherical surface 22 according to messages displayed on the display screen 6. Since the inputting is performed according to menu selection, it is not necessary to automatically determine the input order. The inputting of the polar coordinates and the axial rotation angle may be interchanged. Since the projection conversion circuit 15, the polar coordinates calculation circuit 17 and the axial rotation angle calculation circuit 18 operate in the same manner as in the previous embodiment, a description therefor is omitted here. The input method of the present embodiment is preferable for users who are not accustomed to the input operation because of the clarity of the order of specifying the components.

According to the present invention, the operation of rotating an object in three-dimensional space can be performed on a two-dimensional input apparatus in a direct manner. Since interactive data input by pen-manipulation is possible, the ease of operations of the apparatus is greatly improved.

While there has been described and illustrated apparatus for and methods of practicing the present invention, it will be apparent to those skilled in the art that variations and modifications are possible without deviating from the spirit and broad scope of the invention which shall be limited solely by the claims appended hereto.

What is claimed is:

1. A method of rotating an object being displayed in three-dimensional space by a graphic display apparatus, comprising the steps of:

displaying, on said display apparatus, a semitransparent spherical surface enclosing said object being displayed and having an origin;

specifying four points on said spherical surface, a first one and a second one of said four specified points defining two pairs of polar surface coordinates in a polar coordinate system, and a third one and a fourth one of said four specified points defining an angle $\alpha$ with respect to said second point;

computing a difference between said two pairs of polar surface coordinates;

performing a first calculation for rotating said object in said polar coordinate system in accordance with said computed difference;

performing a second calculation for rotating said object about an axis connecting said origin to said second point by said angle $\alpha$; and displaying, on said display apparatus, said object after being subjected to rotations in accordance with said first and second calculations.

2. A method as defined in claim 1 wherein said first and second points are identical.

3. A method as defined in claim 1 wherein said first, second, third and fourth points are specified in a predetermined order.

4. A graphic display apparatus for rotating an object being displayed in three-dimensional space, comprising:

display means for displaying a semitransparent spherical surface enclosing an object being displayed and having an origin;

means for specifying four points on said spherical surface, a first one and a second one of said four specified points defining two pairs of polar surface coordinates in a polar coordinate system, and a third one and a fourth one of said four specified points defining an angle $\alpha$ with respect to said second point;

means for computing a difference between said two pairs of polar surface coordinates;

means for performing a first calculation for rotating said object in said polar coordinate system in accordance with said computed difference;

means for performing a second calculation for rotating said object about an axis connecting said origin to said second point by said angle $\alpha$; and means for displaying said object after being subjected to rotations in accordance with said first and second calculations.

5. A graphic display apparatus as defined in claim 4 wherein said means for specifying four points includes a pen input device for defining positions graphically on the displayed spherical surface.

\* \* \* \* \*